United States Patent
Balthaze et al.

(10) Patent No.: US 10,277,087 B2
(45) Date of Patent: Apr. 30, 2019

(54) ROTOR COIL INSULATING DEVICE

(71) Applicant: VALEO EQUIPEMENTS ELECTRIQUES MOTEUR, Creteil (FR)

(72) Inventors: Patrice Balthaze, Etaples sur Mer (FR); Pierre-Yves Bilteryst, Brimeux (FR); Henri Delianne, Maresville (FR); David Margueritte, Wailly Beaucamp (FR); Michel Bocquel, Cabourg (FR)

(73) Assignee: Valeo Equipments Electriques Moteur, Creteil (FR)

( * ) Notice: Subject to any disclaimer, the term of this patent is extended or adjusted under 35 U.S.C. 154(b) by 252 days.

(21) Appl. No.: 15/126,732

(22) PCT Filed: Feb. 20, 2015

(86) PCT No.: PCT/FR2015/050421
§ 371 (c)(1),
(2) Date: Sep. 16, 2016

(87) PCT Pub. No.: WO2015/145002
PCT Pub. Date: Oct. 1, 2015

(65) Prior Publication Data
US 2017/0170699 A1     Jun. 15, 2017

(30) Foreign Application Priority Data

Mar. 28, 2014 (FR) .................................. 14 52687

(51) Int. Cl.
*H02K 3/32* (2006.01)
*H02K 3/34* (2006.01)
*H02K 3/52* (2006.01)

(52) U.S. Cl.
CPC ............. *H02K 3/325* (2013.01); *H02K 3/345* (2013.01); *H02K 3/528* (2013.01); *Y02E 10/725* (2013.01)

(58) Field of Classification Search
CPC ........ H02K 3/325; H02K 3/345; H02K 3/528; Y02E 10/7255
USPC ........................................................ 310/215
See application file for complete search history.

(56) References Cited

U.S. PATENT DOCUMENTS

| | | | |
|---|---|---|---|
| 5,574,324 A * | 11/1996 | Hirama | H02K 3/528 310/194 |
| 2005/0218744 A1* | 10/2005 | Nakanishi | H02K 3/18 310/194 |
| 2005/0242680 A1* | 11/2005 | Militello | H02K 3/528 310/194 |

(Continued)

FOREIGN PATENT DOCUMENTS

| | | | |
|---|---|---|---|
| FR | 2612349 | 9/1988 | |
| FR | 2612349 A1 * | 9/1988 | H02K 3/528 |

*Primary Examiner* — Forrest M Phillips
(74) *Attorney, Agent, or Firm* — Berenato & White, LLC

(57) ABSTRACT

An insulating device (10) of a rotor winding, which includes a device for positioning the insulator relative to a pole wheel including teeth and spaces between the teeth, which comprises at least two feet (102) on a surface (101) of the insulator that engages with a surface of the pole wheel, the feet each having at least two separate contacts among the following contacts: contact on a side surface of one tooth; contact on a side surface of an adjacent tooth; contact on an interstitial surface between one tooth and the adjacent tooth.

20 Claims, 5 Drawing Sheets

(56) References Cited

U.S. PATENT DOCUMENTS

| | | | | |
|---|---|---|---|---|
| 2007/0114879 A1* | 5/2007 | Maeda | ................... | H02K 3/528 |
| | | | | 310/263 |
| 2015/0244230 A1* | 8/2015 | Yoon | ................... | H02K 15/063 |
| | | | | 310/215 |
| 2015/0311761 A1* | 10/2015 | Hattori | ..................... | H01B 3/52 |
| | | | | 310/215 |
| 2016/0380521 A1* | 12/2016 | Tsuchiya | ................ | H02K 3/325 |
| | | | | 310/215 |

* cited by examiner

ROTOR COIL INSULATING DEVICE

CROSS-REFERENCE TO RELATED APPLICATIONS AND CLAIM TO PRIORITY

This application is a national stage application of International Application No. PCT/FR2015/050421 filed Feb. 20, 2015, which claims priority to French Patent Application No. 1452687 filed Mar. 28, 2014, the disclosures of which are incorporated herein by reference and to which priority is claimed.

FIELD OF THE INVENTION

The present invention relates to a rotor coil insulating device and a vehicle comprising a device of this type. The invention applies in particular in the field of motor vehicles, and more particularly to rotary electrical machines such as motors, alternators and alternator starters. More particularly, the invention concerns the assembly of magnet wheels for a rotor of an electrical machine which is equipped with interpolar permanent magnets.

BACKGROUND OF THE INVENTION

During the assembly or packing of a motor or alternator which uses a toothed wheel mechanism, a coil which is wound around an insulator is inserted between two permanent magnet wheels which create the rotor. The coil, the insulator and the toothed wheels are coaxial devices. The insulator must be centred relative to the cores of the magnet wheels, and its rotation relative to the magnet wheels must be blocked. The coil must also be blocked in rotation around the axis of the insulator.

In the prior art, these functions were carried out by godroons. However, the production of parts comprising godroons is difficult to control. In addition, a device comprising godroons is difficult to assemble, since the two magnet wheels are guided by godroons. Also, the godroons have a small size, and their lateral surfaces prevent the rotation of the insulator relative to the magnet wheels. The lateral surfaces are thus subjected to high shearing stresses. In addition, the use of godroons prevents freedom of one magnet wheel relative to the other during the packing.

SUMMARY OF THE INVENTION

The objective of the present invention is to eliminate some or all of these disadvantages. For this purpose, according to a first aspect, the present invention relates to a rotor insulating device comprising a device for positioning the insulator relative to a magnet wheel comprising teeth and gaps between the teeth, which device comprises at least two feet, on a face of the insulator which comes into contact with a face of the magnet wheel, the feet each having at least two distinct contacts from amongst the following contacts:

contact on a lateral face of a tooth;
contact on a lateral face of an adjacent tooth;
contact on an interstitial face between a tooth and the adjacent tooth.

The contacts between the feet of the insulator and the teeth or the gaps of the magnet wheel provide a function of centring and anti-rotation of the insulator relative to the teeth of the magnet wheel.

In addition, in some embodiments, the contact surface can be large, which makes it possible to distribute the shearing forces. Also, during tests carried out on the rotor, if the surface which makes possible the anti-rotation is large, the results will be improved.

Also, the two magnet wheels which constitute the rotor and are placed on both sides of the insulator are independent from one another. With the insulator being positioned relative to one of the magnet wheels, the other magnet wheel can be positioned freely.

In some embodiments, the device comprises, on a flat face of the coil insulator parallel to the face comprising the feet, at least one lug which is deformed when the insulator is put into position, thus retaining the coil in position.

The advantage of these embodiments is to permit the immobilisation of the coil relative to the insulator by deformation of the insulator. In addition, the lugs make it possible to limit the vibrations. The play between the insulator and the magnet wheel, as well as the play between the insulator and the coil, are eliminated during the deformation of the insulator.

In some embodiments, the device comprises at least one through opening in at least one flat face of the coil insulator.

Varnish is used for the resistance to vibration of the coil. These embodiments have the advantage of permitting improved penetration of the varnish for improved impregnation of the upper layers of the coil by the varnish.

In addition, when the holes are filled with varnish, they provide a mechanical connection, and the dried varnish covers the upper layers of the coil, the insulator and one of the magnet wheels of the rotor. The dried varnish increases the resistance to vibration of the magnet wheel and the insulator.

In some embodiments, the device which is the subject of the present invention comprises at least one lug on the inner face of the core of the insulator.

These embodiments have the advantage of permitting close adjustment of the core of the insulator around the cores of the magnet wheels.

In some embodiments, the outer surface of a foot of the device is in contact with a tooth of a magnet wheel which is complementary to the magnet wheel.

These embodiments have the advantage of ensuring retention in position of the second magnet wheel, and of reducing the residual gap.

In some embodiments, the feet are distributed regularly.

Regular distribution of the feet permits more regular retention in position.

In some embodiments, the lugs are distributed regularly.

The advantage of these embodiments is to distribute regularly the plastic deformation of the insulator, and thus to permit balanced immobilisation of the coil.

In some embodiments, the device which is the subject of the present invention comprises four feet.

These embodiments have the advantage of permitting a large number of contacts, thus ensuring retention in position. In addition, in some embodiments, a foot can be in contact with a lateral surface of a tooth and the interstitial face, and the adjacent foot can be in contact with another adjacent interstitial face and the other lateral face of the same tooth. The retention in position is well ensured. However, the forces for retention in position are concentrated on one tooth. With two other teeth, for the same principle, the forces are distributed.

In some embodiments, the device which is the subject of the present invention comprises at least two contacts with the same face of the tooth.

Since the contact surface is larger, the forces for retention in position are distributed better. In addition, if there are two parallel contacts on the lateral surface, the centring is more precise.

In some embodiments, the insulator is made of plastic material.

The advantage of these embodiments is to have possible deformation, and to be insulating.

In some embodiments, at least one characteristic dimension of a section of the base of the foot is larger than at least one corresponding characteristic dimension of a section of the top of the foot.

These embodiments have the advantage of permitting easier putting into position: the smaller dimensions at the top of the foot permit easier insertion of the insulator between the claws.

In some embodiments, a dimension which is known as the "low width" of a section at the base of a foot, and a dimension which is known as the "high width" of a section of the top of the foot, are characteristic dimensions, and are parallel to the radius of the insulator.

The advantage of these embodiments is to create a chamfer on the top of the outer face of the foot, for example, which guides the fitting of the second magnet wheel.

In some embodiments, a dimension which is known as the "high length" of a section at the base of the foot, and a dimension which is known as the "low length" of a section of the top of the foot, are characteristic dimensions, and are orthogonal to the radius of the insulator.

These embodiments have the advantage of limiting the size of the top of the foot, in order to permit easier insertion of the insulator between the teeth.

In some embodiments, the magnet wheel is obtained by forging.

These embodiments have the advantage of having a simple production method. This production method which is simple to implement also makes it possible to obtain lower levels of scrap, to use a term which is well known to persons skilled in the art.

In some embodiments, the method for forging of the magnet wheel comprises a step of hot forging and a step of cold forging.

The advantage of these embodiments is to reduce the duration of production, as well as to simplify the production method. In addition, since the form of the coil insulator is less constrained, it is possible to use a forging method for the creation of the magnet wheels.

According to a second aspect, the present invention relates to a vehicle comprising a rotor comprising a device which is the subject of the present invention.

The vehicle is thus assembled more rapidly.

BRIEF DESCRIPTION OF THE DRAWINGS

Other advantages, objectives and characteristics of the invention will become apparent from the following non-limiting description of a particular embodiment of the rotor coil insulating device and of the vehicle comprising a device of this type, in relation to the appended drawings, in which.

DETAILED DESCRIPTION OF THE PREFERRED EMBODIMENT(S)

It should be noted at this point that the figures are not to scale.

Figure 1:
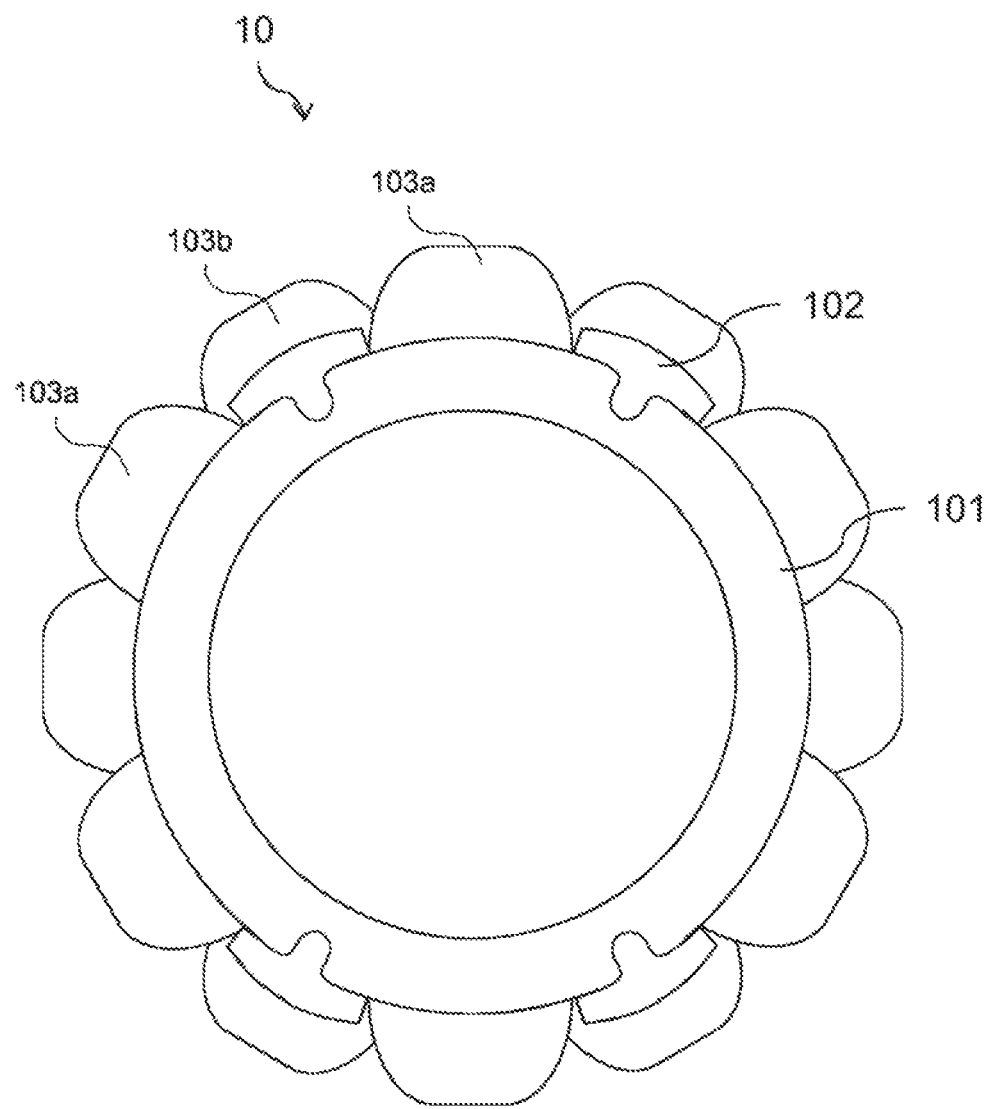
FIG. 1 represents schematically and in plan view a view from above of a particular embodiment of the device which is the subject of the present invention.

FIG. 1 shows a view from above of an embodiment of a rotor coil insulating device (or insulator) 10 comprising a device for putting the rotor coil insulating device 10 into position relative to a magnet wheel comprising teeth and gaps between the teeth, which device comprises at least two feet 102 on a first planar axial face 101 of the rotor coil insulating device 10 which comes into contact with a face of the magnet wheel. The first axial face 101 is flat (i.e., planar) and radially oriented. Preferably, the rotor coil insulating device 10 is made of plastic material. The rotor coil insulating device 10 additionally comprises a plurality of petals 103a, 103b which are folded back such as each to be in contact with an inner surface of a tooth of the rotor. The petals 103a are arranged along one of the magnet wheels, and the petals 103b are arranged along the other magnet wheel. In some embodiments, a foot 102 is positioned between two consecutive petals 103a arranged along a single magnet wheel.

The tooth can project relative to the first axial face 101 of the insulator 10. In some embodiments, the first axial face 101 is circular, and a base of the foot 102 projects relative to an outer circle of the first axial face 101. The number of the feet 102 can be four. Preferably, the feet 102 are distributed regularly.

In some embodiments, two feet 102 are on the face 101. In some embodiments, the number of feet 102 is equal to the number of gaps between the teeth of the magnet wheel. In some embodiments, the feet 102 are distributed symmetrically.

Figure 2:
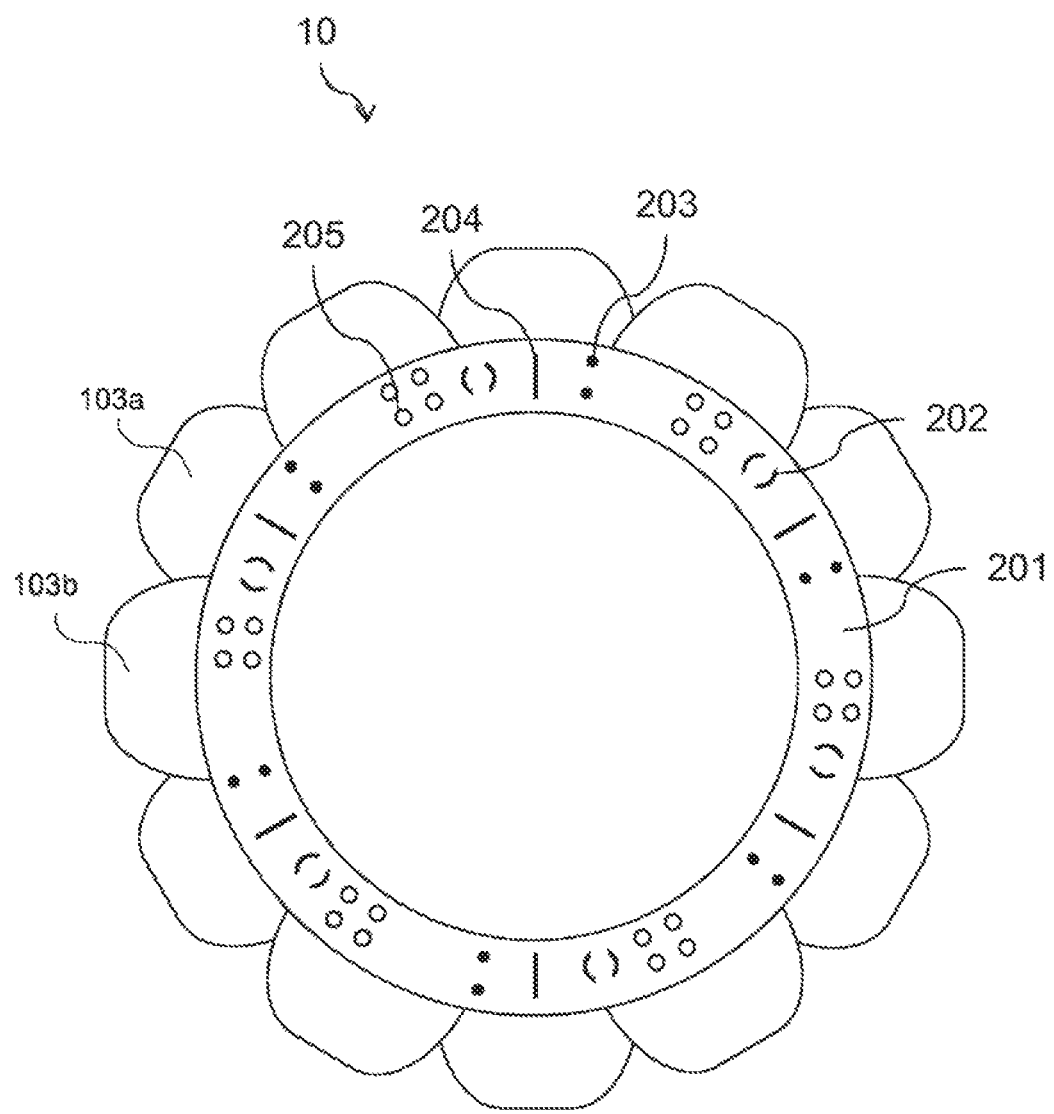
FIG. 2 represents schematically and in plan view a view from below of a particular embodiment of the device which is the subject of the present invention.

FIG. 2 shows a view from below of an embodiment of the rotor coil insulating device 10. A second planar axial face 201, which is preferably parallel and axially opposite to the first axial face 101, comprises lugs 202, 203 and 204. The face 201 is preferably circular.

The lugs 202 are preferably arcs of a circle which project relative to the face 201. The lugs 202 can be situated around an opening provided in the face 201, for example.

The lugs 203 are preferably circular reliefs which project relative to the face 201. A plurality of lugs 203 can be aligned radially.

The lugs 204 are preferably linear reliefs which project relative to the face 201. The lugs 201 can be straight and oriented such as to be co-linear with a radius of the face 201.

The lugs 202, 203, 204 can:
comprise a chamfer;
be distributed regularly;

be configured to deform the insulator during the packing, and thus to retain the coil in position.

A single type of lug from amongst the lugs 202, 203 and 204 can be put into place on the insulator 10. Conversely, a plurality of lugs of different types from amongst the lugs 202, 203 and 204 can be put into place simultaneously.

In some embodiments, lugs 202, 203 and 204 situated on the inner face of the core of the insulator 10.

In some embodiments, lugs can have a form which is square, circular, conical, triangular, or any other form, the surface of which does not extend beyond the surface of the face on which the lug is situated.

The face 201 can comprise at least one through opening 205. The through opening 205 is preferably circular, with a diameter of between 3 mm and 6 mm. In some embodiments, openings can have a form which is square, circular, conical, triangular, or any other form, the surface of which does not extend beyond the surface of the face on which the lug is situated.

Preferably, the openings 205 are distributed regularly. The opening can be configured to allow varnish to flow. The surface area of the opening can depend on the viscosity of the varnish. Preferably, the surface area of the opening is larger than one square millimeter.

The face 101 can comprise openings 205. The openings 205 in the face 101 can correspond to the openings 205 in the face 201.

Figure 3:
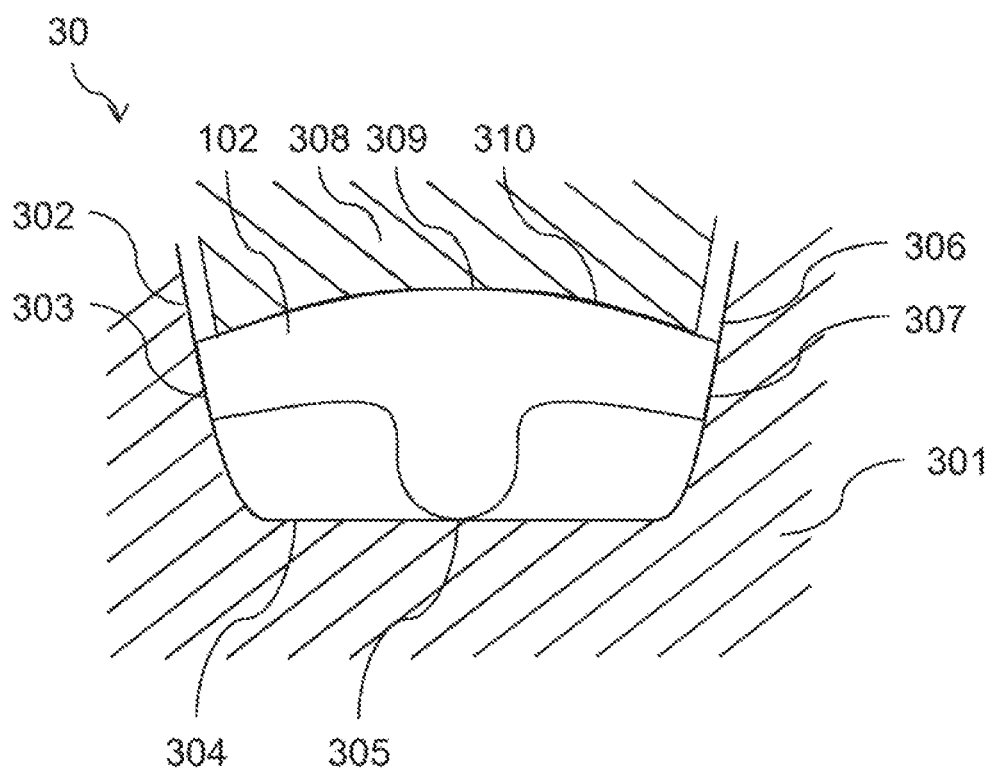
FIG. 3 represents, schematically and in cross-section a particular embodiment of the device which is the subject of the present invention.

FIG. 3 shows a cross-section of a particular embodiment 30 of a foot 102 of the device 10 which is the subject of the present invention.

The foot 102 can be inserted in the gap between the adjacent (or consecutive) teeth of a first magnet wheel 301. The foot 102 can come into contact with three faces which characterize two consecutive teeth of the first magnet wheel, and the gap between these teeth:

a lateral face 302 on the side of a tooth of the first magnet wheel 301;

an interstitial face 304 between the teeth, close to the base of the magnet wheel; and a lateral face 306 on the side of an consecutive tooth of the first magnet wheel 301.

The faces 302, 304 and 306 can form part of a single curve.

During the packing, a radially inner face 309 of a tooth of a second magnet wheel 308 can be in contact with a radially outer face of the foot 102.

The foot 102 can have:
a contact 303 with the face 302 of the magnet wheel 301;
a contact 305 with the face 304 of the magnet wheel 301;
a contact 307 with the face 306 of the magnet wheel 301 and;
a contact 310 with the face 309 of the magnet wheel 308.

The contacts 303, 305, 307 and 310 can be intermittent, linear or planar. The contacts 303, 307 and 310 are preferably planar. The contact 305 is preferably linear.

The form of the outer face of the foot 102 preferably has a profile which is complementary to the profile of the tooth 308.

The profile of the foot 102 in the embodiment 30 can be a so-called profile in the form of a "T" with a point of contact. Preferably, the foot 102 ensures the centring.

Figure 4:
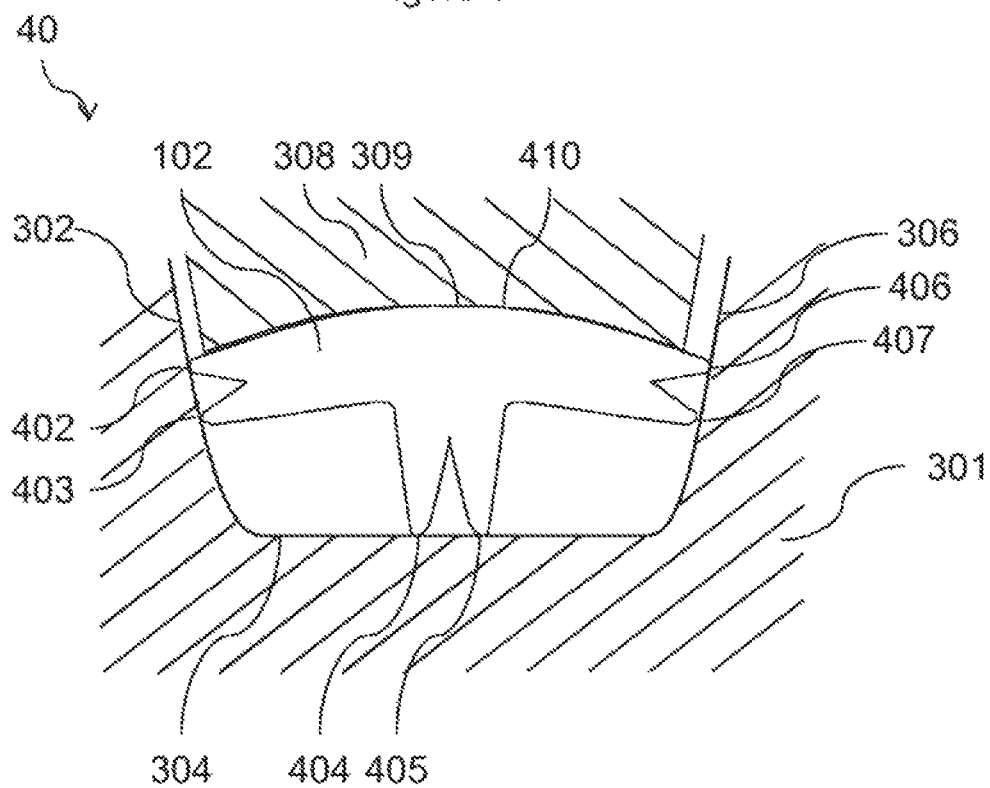
FIG. 4 represents, schematically and in cross-section a particular embodiment of the device which is the subject of the present invention.

FIG. 4 shows a cross-section of a particular embodiment 40 of a foot 102 of the device 10 which is the subject of the present invention.

The foot 102 can be inserted in the gap between the adjacent teeth of a magnet wheel 301. The foot 102 can come into contact with three faces which characterise two adjacent teeth of a magnet wheel, and the gap between these teeth:

a face 302 on the side of a tooth;

an interstitial face 304 between the teeth, close to the base of the magnet wheel; and a face 306 on the side of an adjacent tooth.

The faces 302, 304 and 306 can form part of a single curve.

During the packing, an inner face 309 of a tooth of the second magnet wheel 308 can be in contact with an outer face of the foot 102.

The foot 102 can have:
two contacts 402 and 403 with the face 302 of the magnet wheel 301;
two contacts 404 and 405 with the face 304 of the magnet wheel 301;
two contacts 406 and 407 with the face 306 of the magnet wheel 301 and;
a contact 410 with the face 309 of the magnet wheel 308.

The contacts 402, 403, 404, 405, 406, 407 and 410 can be intermittent, linear or planar. The contacts 402, 403, 404, 405, 406, 407 and 410 are preferably linear.

The form of the outer face of the foot 102 preferably has a profile which is complementary to the profile of the tooth 308.

The profile of the foot 102 in the embodiment 40 can be a so-called profile in the form of a "T" with two points of contact. Preferably, the foot 102 ensures the centring, and the anti-rotation of the insulator relative to the magnet wheel.

Figure 5:
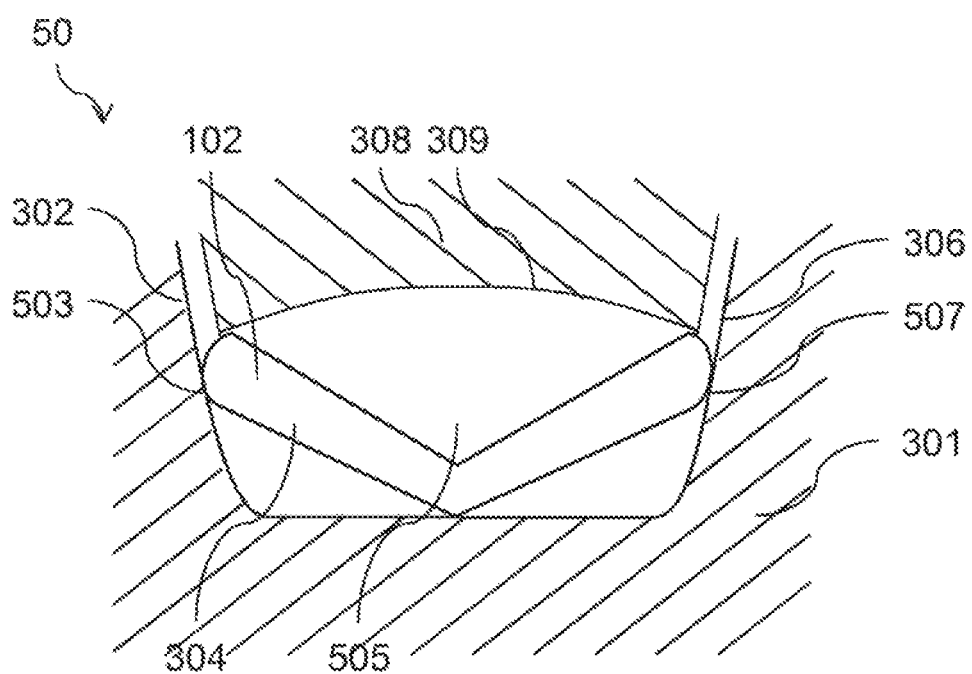
FIG. 5 represents, schematically and in cross-section a particular embodiment of the device which is the subject of the present invention.

FIG. 5 shows a cross-section of a particular embodiment 50 of a foot 102 of the device 10 which is the subject of the present invention.

The foot 102 can be inserted in the gap between the adjacent teeth of a magnet wheel 301.

The foot 102 can come into contact with three faces which characterise two adjacent teeth of a magnet wheel, and the gap between these teeth:

a face 302 on the side of a tooth;

an interstitial face 304 between the teeth, close to the base of the magnet wheel; and a face 306 on the side of an adjacent tooth.

The faces 302, 304 and 306 can form part of a single curve.

During the packing, an inner face 309 of a tooth of the second magnet wheel 308 preferably does not come into contact with the foot 102.

The foot 102 can have:
a contact 503 with the face 302 of the magnet wheel 301;
a contact 505 with the face 304 of the magnet wheel 301;
a contact 507 with the face 306 of the magnet wheel 301.

The contacts 503, 505, 507 can be intermittent, linear or planar. The contacts 503, 505, 507 are preferably linear.

The form of the outer face of the foot 102 preferably has concave profile in order not to come into contact with the face 309 of the magnet wheel 308.

The profile of the foot 102 in the embodiment 50 can be a so-called profile in the form of a "V". Preferably, the foot 102 ensures the centring and the anti-rotation of the insulator relative to the magnet wheel.

Figure 6:
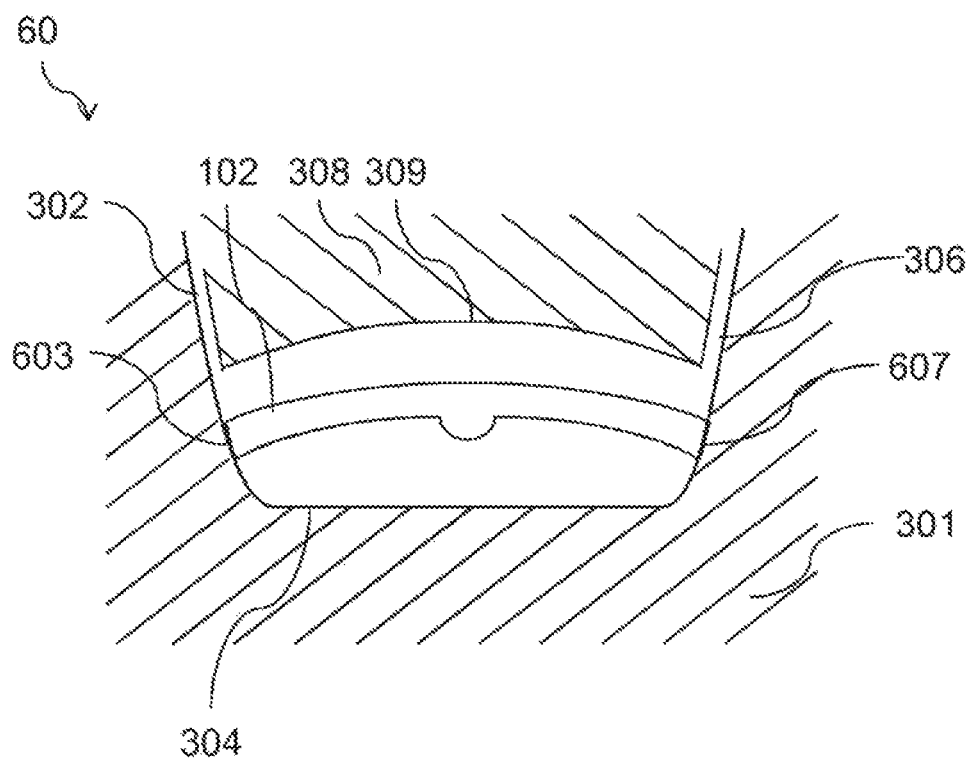
FIG. 6 represents, schematically and in cross-section a particular embodiment of the device which is the subject of the present invention.

FIG. 6 shows a cross-section of a particular embodiment 60 of a foot 102 of the device 10 which is the subject of the present invention.

The foot 102 can be inserted in the gap between the adjacent teeth of a magnet wheel 301.

The foot 102 can come into contact with three faces which characterise two adjacent teeth of a magnet wheel, and the gap between these teeth:
- a face 302 on the side of a tooth;
- an interstitial face 304 between the teeth, close to the base of the magnet wheel; and
- a face 306 on the side of an adjacent tooth.

The faces 302, 304 and 306 can form part of a single curve.

During the packing, an inner face 309 of a tooth of the second magnet wheel 308 preferably does not come into contact with the foot 102.

The foot 102 can have:
- a contact 603 with the face 302 of the magnet wheel 301; and
- a contact 607 with the face 306 of the magnet wheel 301.

The contacts 603, 607 can be intermittent, linear or planar. The contacts 603, 607 are preferably planar.

The profile of the foot 102 in the embodiment 60 can be a so-called "flat profile". Preferably, the foot 102 ensures the anti-rotation of the insulator relative to the magnet wheel.

In some embodiments, all the feet 102 of the insulator are the same. In other embodiments, a plurality of different embodiments from amongst the embodiments 30, 40, 50 and 60 are used.

In some embodiments, the foot 102 is in the form of an "L", in other words it comes into contact with the face 305 of the magnet wheel 301, and with one of the faces 303 or 307 of the magnet wheel 301.

In some embodiments, a cross-section of the base of the foot is larger than at least one corresponding characteristic dimension of a section of the top of the foot. The characteristic dimension can be:
- the width, i.e. a dimension parallel to the radius of the insulator;
- the length, i.e. a dimension perpendicular to the radius of the insulator.

For the foot 102 in the embodiment 30, the width can be the distance between the point of contact 305 and the point on the outer face of the foot, according to a line perpendicular to the point of contact 305. The length can be the distance between the ridge of intersection between the outer face and the contact face 303 of the foot, and the ridge of intersection between the outer face and the contact face 307 of the foot.

For the foot 102 in the embodiment 40, the width can be the distance between the middle of the segment between the contact ridges 404 and 405, and the point on the outer face of the foot according to a line perpendicular to the segment defined. The length can be the distance between the ridge of intersection between the outer face and the contact face 402 of the foot, and the ridge of intersection between the outer face and the contact face 406 of the foot.

For the foot 102 in the embodiment 50, the width can be the difference between the point of contact 505, and the point on the outer face of the foot, according to a line perpendicular to the point of contact 505. The length can be the distance between the contact ridge 503 of the foot 102, and contact ridge 507 of the foot 102-3.

For the foot 102 in the embodiment 60, the width can be the longest distance between the inner face of the foot and the outer face of the foot, according to a line perpendicular to the outer face. The length can be the distance between the ridge of intersection between the outer face and the contact face 603 of the foot, and the ridge of intersection between the outer face and the contact face 607 of the foot.

The embodiments of the aforementioned feet 102 are preferably adjusted so as to be clamped on the base of the foot.

In some embodiments, the magnet wheels 301 and 308 are obtained by forging. The forging method can comprise a step of hot forging and a step of cold forging. Preferably, these steps take place in the order previously described.

The step of cold forging can comprise two steps of stamping corresponding to two stamping operations on the magnet wheel. The second stamping operation makes the part more accurate. The stamping steps are preferably followed by steps of cutting of upset material driven by the stamping operations.

Figure 7:
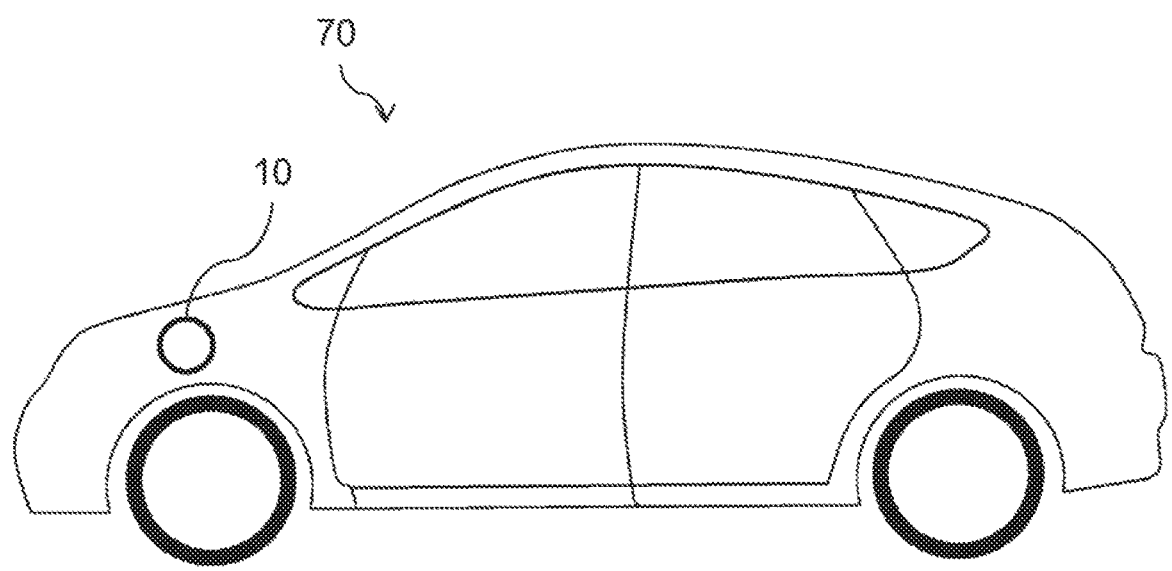
FIG. 7 represents, schematically and in side view a particular embodiment of the vehicle which is the subject of the present invention.

FIG. 7 shows a particular embodiment of a vehicle 20 which is the subject of the present invention.

The vehicle 20 can comprise a rotary electrical machine such as a motor, an alternator or an alternator-starter, comprising a claw rotor, the coil of which is insulated by a device 10 which is the subject of the present invention.

The invention claimed is:

1. A rotor coil insulating device (10) for a rotor including first and second magnet wheels (301, 308) each comprising teeth and gaps between the teeth, the rotor coil insulating device (10), comprising:
   a positioning device for positioning the coil insulating device (10) relative to the first magnet wheel (301), the rotor coil insulating device (10) having a first planar axial face (101);
   the positioning device comprising at least two feet (102) on the first planar axial face (101) of the rotor coil insulating device (10) coming into contact with the first magnet wheel (301), each of the feet having at least two distinct contacts of from amongst the following contacts:
      a contact on a lateral face (302) of one of the teeth of the first magnet wheel (301);
      a contact on a lateral face (306) of a consecutive tooth of the first magnet wheel (301);
      a contact on an interstitial face (304) between the consecutive teeth of the first magnet wheel (301);
   the lateral faces (302, 306) and the interstitial face (304) of the first magnet wheel (301) defining a gap between the consecutive teeth of the first magnet wheel (301).

2. The rotor coil insulating device (10) according to claim 1, further comprising a second planar axial face (201) parallel to the first planar axial face (101), and at least one lug (202, 203 or 204) on the second planar axial face (201), wherein the at least one lug (202, 203 or 204) is deformed when the coil insulating device (10) is mounted to the rotor for retaining the coil.

3. The rotor coil insulating device (10) according to claim 1, further comprising at least one through opening (205) in at least one of the first and second planar axial faces (101 or 201) of the rotor coil insulating device (10).

4. The rotor coil insulating device (10) according to claim 2, further comprising at least one lug (202, 203 or 204) on an inner face of a core of the rotor coil insulating device (10).

5. The rotor coil insulating device (10) according to claim 1, wherein an outer surface of the foot (102) is in contact with the tooth of the second magnet wheel (308) complementary to the first magnet wheel (301).

6. The rotor coil insulating device (10) according to claim 1, wherein the feet (102) are distributed regularly.

7. The rotor coil insulating device (10) according to claim 2, wherein the insulating device (10) comprises a plurality of lugs (202, 203 or 204) distributed regularly.

8. The rotor coil insulating device (10) according to claim 1, comprising four feet (102).

9. The rotor coil insulating device (10) according to claim 1, wherein the at least two contacts are with the same face of the tooth.

10. The rotor coil insulating device (10) according to claim 1, wherein the rotor coil insulating device (10) is made of plastic material.

11. The rotor coil insulating device (10) according to claim 1, wherein at least one characteristic dimension of a section of a base of the foot (102) is larger than at least one corresponding characteristic dimension of a section of a top of the foot.

12. The rotor coil insulating device (10) according to claim 11, wherein a "low width" dimension of the section at the base of the foot (102), and "high width" dimension of the section of the top of the foot, are characteristic dimensions, and are parallel to a radius of the rotor coil insulating device (10).

13. The rotor coil insulating device (10) according to claim 11, wherein a "high length" dimension of the section at the base of the foot (102), and a "low length" dimension of the section of the top of the foot, are characteristic dimensions, and are orthogonal to the radius of the rotor coil insulating device (10).

14. The rotor coil insulating device (10) according to claim 1, wherein at least one of the first and second magnet wheels (301 or 308) is forging forged.

15. The rotor coil insulating device (10) according to claim 14, wherein the at least one of the first and second magnet wheels (301 or 308) is formed by a forging method comprising a step of hot forging and a step of cold forging.

16. A vehicle (70) comprising a rotor comprising the rotor coil insulating device (10) according to claim 1.

17. The rotor coil insulating device (10) according to claim 2, further comprising at least one through opening (205) in at least one of the first and second planar axial faces (101 or 201) of the coil insulating device (10).

18. The rotor coil insulating device (10) according to claim 2, wherein an outer surface of the foot (102) is in contact with the tooth of the second magnet wheel (308) complementary to the first magnet wheel (301).

19. The rotor coil insulating device (10) according to claim 3, wherein an outer surface of the foot (102) is in contact with the tooth of the second magnet wheel (308) complementary to the first magnet wheel (301).

20. The rotor coil insulating device (10) according to claim 4, wherein an outer surface of a foot (102) is in contact with the tooth of the second magnet wheel (308) complementary to the first magnet wheel (301).

* * * * *